US012658495B2

(12) United States Patent　(10) Patent No.:　US 12,658,495 B2

Furukawa et al.　(45) Date of Patent:　Jun. 16, 2026

(54) SECONDARY BATTERY SYSTEM, CONTROLLER AND CONTROL METHOD FOR SECONDARY BATTERY SYSTEM, AND NON-TRANSITORY COMPUTER READABLE MEDIUM STORING PROGRAM FOR SECONDARY BATTERY SYSTEM CONTROLLER

(71) Applicant: Prime Planet Energy & Solutions, Inc., Tokyo (JP)

(72) Inventors: Kimihiko Furukawa, Kakogawa (JP); Kensaku Fukumoto, Kato (JP); Taijyu Morishita, Kasai (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 628 days.

(21) Appl. No.: 18/182,376

(22) Filed: Mar. 13, 2023

(65) Prior Publication Data

US 2023/0299376 A1　Sep. 21, 2023

(30) Foreign Application Priority Data

Mar. 16, 2022　(JP) ................................. 2022-041513

(51) Int. Cl.
H01M 10/633　(2014.01)
G05B 19/042　(2006.01)
(Continued)

(52) U.S. Cl.
CPC ........ H01M 10/633 (2015.04); G05B 19/042 (2013.01); H01M 10/482 (2013.01);
(Continued)

(58) Field of Classification Search
CPC ............. H01M 10/633; H01M 10/482; H01M 10/6571; H01M 50/51; H01M 2220/20;
(Continued)

(56) References Cited

U.S. PATENT DOCUMENTS

| | | | |
|---|---|---|---|
| 2011/0318616 A1 | 12/2011 | Kim et al. | |
| 2015/0008887 A1 | 1/2015 | Kim et al. | |
| 2019/0089020 A1* | 3/2019 | Ikeno ................. | H01M 10/441 |

FOREIGN PATENT DOCUMENTS

| | | | |
|---|---|---|---|
| JP | 2006-210244 A | 8/2006 | |
| JP | 2012-009407 A | 1/2012 | |

(Continued)

OTHER PUBLICATIONS

Tsuchiya et al., JP 2019-125562, Espacenet machine translation, 2019 (Year: 2019).*

(Continued)

*Primary Examiner* — Adam A Arciero

(74) *Attorney, Agent, or Firm* — HAUPTMAN HAM, LLP

(57)　ABSTRACT

A controller is configured to control distribution circuits of a plurality of battery modules. A first process determines a supplied power supplied to a heating device of each of the plurality of battery modules so that when at least one of the plurality of battery modules has a higher state of charge (SOC) or a higher amount of charge than other ones, the supplied power to the heating device of the at least one battery module is higher than the other ones.

20 Claims, 4 Drawing Sheets

(51) Int. Cl.

| | |
|---|---|
| *H01M 10/48* | (2006.01) |
| *H01M 10/6571* | (2014.01) |
| *H01M 50/51* | (2021.01) |

(52) U.S. Cl.
 CPC ....... *H01M 10/6571* (2015.04); *H01M 50/51* (2021.01); *G05B 2219/2639* (2013.01); *H01M 2220/20* (2013.01)

(58) Field of Classification Search
 CPC ............. H01M 10/425; H01M 10/441; H01M 10/443; H01M 10/486; H01M 10/615; H01M 10/625; H01M 10/63; H01M 10/657; G05B 19/042; Y02E 60/10; Y02T 10/70
 See application file for complete search history.

(56) References Cited

FOREIGN PATENT DOCUMENTS

| | | | |
|---|---|---|---|
| JP | 2015-006043 | A | 1/2015 |
| JP | 2015-076918 | A | 4/2015 |
| JP | 2016-524786 | A | 8/2016 |
| JP | 2018-023270 | A | 2/2018 |
| JP | 2019-021447 | A | 2/2019 |
| JP | 2019-125562 | A | 7/2019 |
| JP | 2021-034217 | A | 3/2021 |
| JP | 2021-061719 | A | 4/2021 |
| JP | 2021-158778 | A | 10/2021 |
| WO | 2016021270 | A1 | 2/2016 |

OTHER PUBLICATIONS

Yamaguchi, JP 2015-076918 A, Espacenet Machine translation, 2015 (Year: 2015).*
Hamada, JP 2021-158778 A, Espacenet machine translation, 2021 (Year: 2021).*

* cited by examiner

SECONDARY BATTERY SYSTEM, CONTROLLER AND CONTROL METHOD FOR SECONDARY BATTERY SYSTEM, AND NON-TRANSITORY COMPUTER READABLE MEDIUM STORING PROGRAM FOR SECONDARY BATTERY SYSTEM CONTROLLER

CROSS REFERENCE TO RELATED APPLICATIONS

The present application claims priority from Japanese Patent Application No. 2022-041513 filed on Mar. 16, 2022, which is incorporated by reference herein in its entirety.

BACKGROUND

The present disclosure relates to a secondary battery system, a controller and control method for the secondary battery system, and a non-transitory computer readable medium storing a program for the secondary battery system controller.

International Publication No. 2016/021270 discloses a technology that relates to a control device for controlling the temperature of a module battery.

According to the disclosure, the current temperature is obtained from a detection result of a temperature sensor for each of a plurality of temperature control units, and in order to bring the temperature to a target temperature, it is determined whether a heater is to be turned on or off based on the current temperature and the temperature profile. Then, if it is determined that the heater is to be turned on and the heater is selected, the heater is turned on, whereas if it is determined that the heater is to be turned on but no heater is selected, or if it is determined that the heater is to be turned off, the heater is turned off.

In order to bring the temperature to the target temperature for each of the plurality of temperature control units at each of a plurality of first update opportunities that come repeatedly at a relatively low frequency, the control device updates the required electric power that needs to be supplied to the heater based on the current temperature and the target temperature and maintains the required electric power to be constant until the next coming first update opportunity. The electric power obtained by adding up the required electric power of a plurality of heaters is considered as the total required electric power, and the electric power obtained by adding up the consumed electric power of the plurality of heaters is considered as the total consumed electric power. Under this condition, a selected one of the plurality of heaters is updated so that the electric power difference between the total required electric power and the total consumed electric power falls within a criteria for each of plurality of second update opportunities that come relatively at a relatively high frequency, and the selected one of the plurality of heaters is maintained to be constant until the next coming second update opportunity.

The publication states that it is possible to stabilize the total consumed electric power of the plurality of heaters, which is obtained by adding up the consumed electric power of each of the plurality of heaters, while bringing the temperature of the module batteries to a target temperature.

SUMMARY

In a battery assembly including a plurality of battery modules, it is sometimes the case that the input/output power may be limited when the battery modules show variation in SOC.

According to the present disclosure, a secondary battery system includes a plurality of battery modules connected in series, and a controller. Each of the plurality of battery modules includes a battery, a heating device, and a distribution circuit connected in parallel with the battery. The heating device is wired to the distribution circuit so as to be supplied with power through the distribution circuit, and is configured so that an amount of heat produced increases according to a supplied power. The controller is configured to execute a first process of determining the supplied power supplied to the heating device of each of the plurality of battery modules so that when at least one of the plurality of battery modules has a higher state of charge (SOC) or a higher amount of charge than other ones, the supplied power to the heating device of the at least one battery module is higher than the other ones.

This secondary battery system is able to reduce variation in SOC among the plurality of battery modules. As a result, the input/output power of the secondary battery system is unlikely to be restricted due to the variation in SOC.

Each of the plurality of battery modules may include a temperature sensor. The controller is configured to execute a second process of determining, prior to the first process, the supplied power supplied to the heating device of at least one of the plurality of battery modules having a temperature lower than a predetermined temperature so that the at least one battery module reaches the predetermined temperature. This secondary battery system is able to eliminate ones of the plurality of battery modules that have a temperature lower than a predetermined temperature and additionally reduce variation in SOC among the plurality of battery modules. As a result, the input/output power of the secondary battery system is unlikely to be restricted due to the variation in SOC.

The present disclosure may also include a controller and a control method for the secondary battery system, and a non-transitory computer readable medium storing a program for the controller for the secondary battery system.

DETAILED DESCRIPTION

Embodiments of the present disclosure will be described hereinbelow. It should be noted, however, that the embodiments illustrated herein are, of course, not intended to limit the disclosure. The present disclosure is not limited to the following embodiments described herein unless specifically stated otherwise. The drawings are depicted schematically and do not necessarily accurately depict actual objects. The features and components that exhibit the same effects are designated by the same reference symbols as appropriate, and the description thereof will not be repeated.

Secondary Battery System 10

Figure 1:
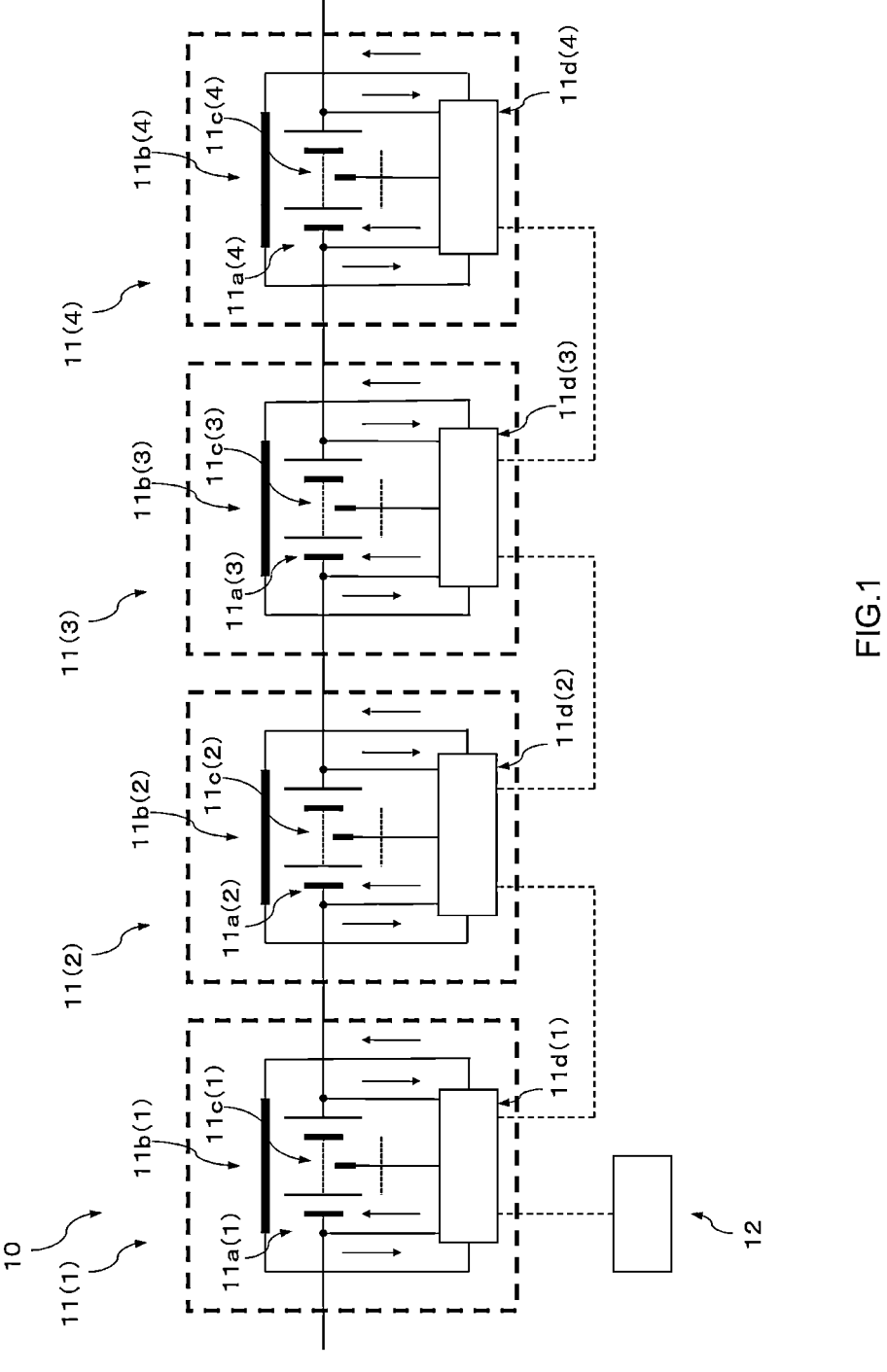
FIG. 1 is a schematic view illustrating an example of the configuration of a secondary battery system 10.

FIG. 1 is a schematic view illustrating an example of the configuration of a secondary battery system 10. As illustrated in FIG. 1, the secondary battery system 10 includes a plurality of battery modules 11 and a controller 12. The secondary battery system 10 may be an on-board system for a battery electric vehicle (BEV) as its battery system. The secondary battery system 10 may also be referred to as a battery pack.

The plurality of battery modules 11 are connected in series. Each of the plurality of battery modules 11 includes a battery 11a, a heating device 11b, a temperature sensor 11c, and a distribution circuit 11d. In FIG. 1, numerals in parentheses are used to distinguish the plurality of battery modules 11 from each other and the constituent components of the plurality of battery modules 11 from each other. In the description, numerals in parentheses are added as appropriate when the plurality of battery modules 11 need to be distinguished from each other or when the constituent components of the plurality of battery modules 11 need to be distinguished from each other.

The battery 11a of each battery module 11 is composed of a battery assembly. In this embodiment, the battery 11a is composed of a battery assembly including a predetermined number of battery cells that are combined together and have uniform designed characteristics, such as rated voltage and SOC. Thus, the characteristics of the battery modules 11, such as rated voltage and SOC, are made uniform among the battery modules 11 in terms of design.

The heating device 11b may be a device that raises its temperature when electric current is passed therethrough. The heating device 11b may be composed of a device that can electrically adjust the amount of heat produced, such as a resistance wire heater and a ceramic heater. The resistance wire heater or the ceramic heater may be equipped with, for example, a thermostat. In this embodiment, the heating device 11b may be configured so that the amount of heat produced can be increased according to the electric power supplied. The heating device 11b may be a heater that can reduce the amount of heating at the time of high temperatures, such as a PTC heater. The heating device 11b is wired to the distribution circuit 11d so as to be supplied with power through the distribution circuit 11d.

The temperature sensor 11c is a sensor that measures the temperature of the battery module 11 that is to be controlled. In this embodiment, the temperature sensor 11c is attached to the battery 11a of the battery module 11. The temperature sensor 11c may be capable of converting temperature into a physical quantity, such as voltage or resistance value, and outputting it. For the temperature sensor 11c, it is possible to use, for example, a thermocouple, a thermistor, and a resistance thermometer bulb.

The distribution circuit 11d is a circuit that is connected in parallel to the battery and is wired to the heating device 11b so as to supply electric power to the heating device 11b. In this embodiment, the plurality of battery modules 11(1) to 11(4) are connected in series in sequence. The distribution circuit 11d is a circuit that distributes electric power from the battery 11a to the heating device 11b in each of the battery modules 11. Specifically, the distribution circuit 11d controls whether or not electric power of the battery module is to be supplied to the heater. The distribution circuit 11d may also be able to apply the voltage of the battery 11a to the heating device 11b in each of the battery modules 11.

Figure 2:
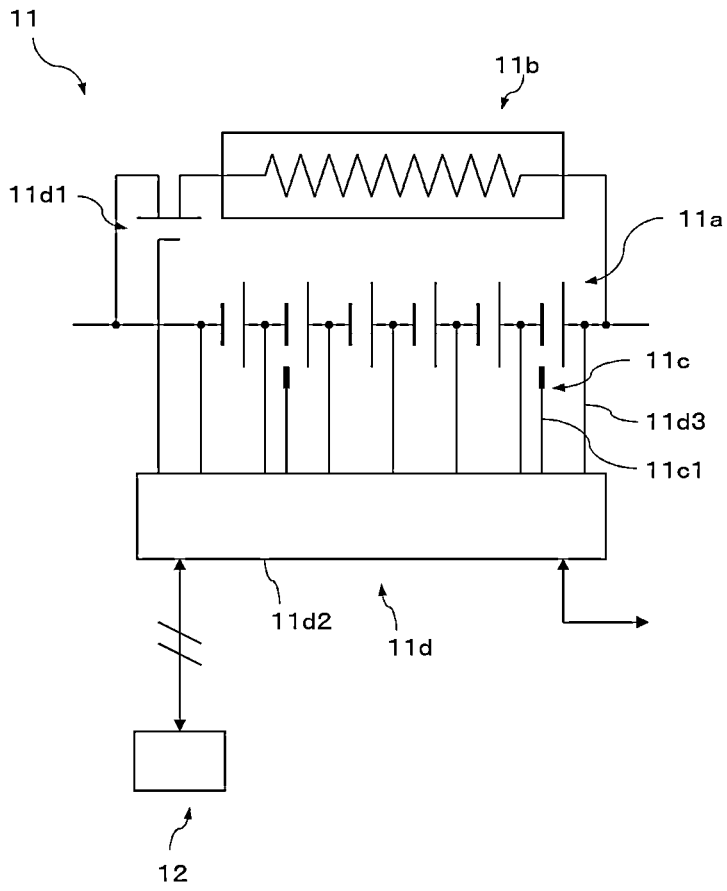
FIG. 2 is a schematic view illustrating an example of the configuration of a distribution circuit 11d.

FIG. 2 is a schematic view illustrating an example of the configuration of the distribution circuit 11d. As illustrated in FIG. 2, the distribution circuit 11d may be composed of a switch 11d1 and a monitor and control circuit 11d2.

In the example shown in FIG. 2, the battery 11a of each battery module 11 includes six battery cells connected in series. Unless otherwise stated, the number of cells in the battery 11a of the battery module 11 is not limited to 6. The heating device 11b is configured to be able to heat the 6 battery cells in the battery 11a of the battery module 11. The temperature sensor 11c is attached to the battery 11a of the battery module 11.

The distribution circuit 11d includes a switch 11d1 and a monitor and control circuit 11d2. In this embodiment, the switch 11d1 is composed of a metal-oxide-semiconductor field-effect transistor (MOSFET). The monitor and control circuit 11d2 is connected to a detection line 11c1 of the temperature sensor 11c. This enables the monitor and control circuit 11d2 to acquire the temperature information of the battery 11a. In addition, the monitor and control circuit 11d2 includes a voltage detection line 11d3 that detects the applied voltage of the battery cells in the battery 11a of the battery module 11. This enables the monitor and control circuit 11d2 to acquire the voltage of the battery 11a of the battery module 11. In the embodiment shown in FIG. 2, the temperature sensor 11c is arranged so as to be capable of acquiring the temperatures of some of the battery cells in the battery module 11. It is also possible that the temperature sensor 11c is arranged so as to be capable of acquiring the temperatures of all the battery cells in the battery module 11.

In the embodiment shown in FIG. 2, the monitor and control circuit 11d2 has the function of measuring the voltage and temperature of each of the cells in the battery module 11 to be monitored and transmitting the measured values to the controller 12 (see FIG. 1). Herein, the controller 12 is a device that controls the plurality of battery modules 11(1) to 11(4) that are incorporated in the secondary battery system 10. The controller 12 is also referred to as a battery module controller (BMC). The monitor and control circuit 11d2 receives commands from the controller 12 and controls the duty ratio of the switch 11d1 to control the amount of heating of the heating device 11b. The monitor and control circuit 11d2 performs communication with the monitor and control circuits 11d2 of other battery modules 11 and communication with the other monitor and control circuits 11d2 and the controller 12.

The distribution circuit 11d is able to output signals to the switch 11d1 to turn the switch 11d1 ON and OFF. By turning the switch 11d1 ON, voltage is applied to the heating device 11b. In this embodiment, the switch 11d1 is a MOSFET and is capable of setting a predetermined duty ratio per one cyclic period. When an external voltage is applied to the battery module 11, the duty ratio represents a proportion in which electric power is supplied to the heating device 11b through the switch 11d1. For example, when the duty ratio is 30%, it means that in the battery module 11, the duration in which the switch 11d1 is ON is 30%. In this case, it means that electric current is distributed to the heating device 11b for 30% of the period, so that the heating device 11b generates heat. Also, in the period in which the switch 11d1 is ON, the amount of charge to the battery 11a reduces because electric current is distributed to the heating device 11b.

For example, for the secondary battery system 10 to be mounted in a battery electric vehicle, an appropriate duty ratio may be set for each of the battery modules 11 when the vehicle is connected to an external power supply and charged. This makes it possible to adjust the amount of heat produced by the heating device 11b and the amount of charge to the battery 11a for each of the battery modules 11. The battery 11a has a suitable temperature for operation, so when it is placed in a very low temperature environment in cold regions, for example, it is difficult to obtain a required input/output power. In view of the problem, when the battery 11a is heated by the heating device 11b to an appropriate temperature while the battery module 11 is being charged, the resistance of the battery module 11 lowers, enabling the charging current to increase and the vehicle to start smoothly, even in cold regions.

In the case where no external voltage is applied to the battery module 11, the battery voltage of the battery 11a is applied to the heating device 11b when the switch 11d1 is turned ON. This allows the battery voltage to be used to heat the battery 11a. In the case where no external voltage is applied to the battery module 11, the battery voltage of the battery 11a is applied to the heating device 11b by turning the switch 11d1 ON. This enables the heating device 11b to be operated using the electric power stored in the battery 11a to heat the battery 11a.

In the embodiment shown in FIG. 1, the plurality of battery modules 11(1) to 11(4) are connected in series. Therefore, the plurality of battery modules 11(1) to 11(4) are charged in the same manner when the same current is applied thereto. Likewise, the plurality of battery modules 11(1) to 11(4) are discharged in the same manner also when they output power. As a result, if the plurality of battery modules 11(1) to 11(4) have variation in their SOC, there may be cases where the plurality of battery modules 11(1) to 11(4) are unable to fully exhibit their performance.

For example, assume that, among the plurality of battery modules 11(1) to 11(4), the battery module 11(1) has an SOC of 45%, the battery module 11(2) has an SOC of 50%, the battery module 11(3) has an SOC of 55%, and the battery module 11(4) has an SOC of 50%.

In this case, when the SOC of the battery module 11(3) reaches a predetermined upper limit value, it is necessary to stop charging to the battery modules 11(1) to 11(4) even when the SOCs of the other battery modules 11(1), 11(2), and 11(4) have not yet reached the upper limit value. This is likewise the case where the plurality of battery modules 11(1) to 11(4) are discharged. The SOC of the battery module 11(1) reaches a predetermined lower limit value before the SOCs of the other battery modules 11(2), 11(3), and 11(4) reach the lower limit value. In this case, the output power of the other battery modules 11(2), 11(3), and 11(4) is restricted according to the battery module 11(1), the SOC of which has reached the lower limit value, by for example, restricting the output power of the plurality of battery modules 11(1) to 11(4).

Thus, the charge and discharge controlling of all the plurality of battery modules 11(1) to 11(4) may be restricted according to one of the battery modules 11 the SOC of which has previously reached the upper limit value or the lower limit value.

There may be cases where a predetermined upper limit value or a predetermined lower limit value is determined for the amount of charge. For example, when the battery system gradually deteriorates and causes variations in the fully charged capacity among the battery modules 11, the battery system may be controlled so that their amounts of charge are equalized, not that their SOCs are made uniform. In this case as well, the charge and discharge controlling of all the plurality of battery modules 11(1) to 11(4) may be restricted according to one of the battery modules 11 the amount of charge of which has previously reached the upper limit value or the lower limit value.

That is, when there are variations in SOC and amount of charge among the battery modules 11 in the secondary battery system 10 mounted on vehicles, the input power and output power may be restricted, and consequently, the secondary battery system 10 is unable to fully exhibit the performance. In view of the problem, the present inventors intend to control the secondary battery system 10 including the plurality of battery modules 11(1) to 11(4) so that variations in SOC and amount of charge among the battery modules 11 can be reduced. On the other hand, in order to reduce variations in SOC and amount of charge among the battery modules 11, it is necessary that electric power be consumed at the portion where the variations occur. The present inventors intend to effectively utilize the electric power of each of the battery modules 11 and also reduce wasteful power consumption in such cases.

Controller 12

As illustrated in FIG. 1, the controller 12 is configured to control the distribution circuits 11d of the plurality of battery modules 11. In this embodiment, the controller 12 is configured to execute a first process and a second process.

First Process

The first process is a process of determining a supplied power supplied to the heating device 11b of each of the plurality of battery modules 11 so that when at least one of the plurality of battery modules 11 has a higher state of charge (SOC) or a higher amount of charge than other battery modules 11, the supplied power to the heating device 11b of the at least one battery module 11 is higher than the other battery modules 11. Herein, SOC refers to the state of charge of a battery. For example, in the case where a predetermined fully charged state is 100% and the battery is charged to a state of charge of 70% relative to the predetermined fully charged state, it is expressed as e.g., 70% SOC. The amount of charge is the amount of electric power charged into a battery, which is expressed in units of kWh, for example. The amount of charge may be defined by, for example, the amount of charge in which a battery 11a is charged from a predetermined lower limit voltage to which the battery 11a has been CCCV discharged. The first process is applied when there are variations in the SOC or amount of charge among the plurality of battery modules 11(1) to 11(4).

Figure 3:
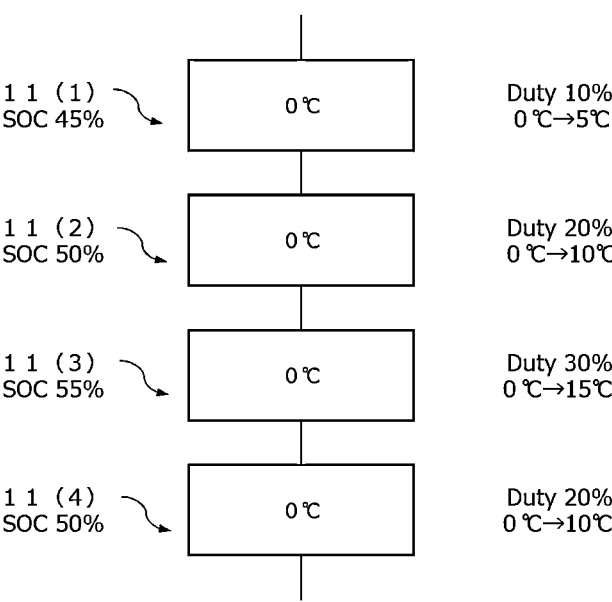
FIG. 3 is a schematic view illustrating an example where a first process is applied.

FIG. 3 is a schematic view illustrating an example where the first process is applied. In the example shown in FIG. 3, the temperature of each of the plurality of battery modules 11(1) to 11(4) is 0° C., which is an ambient temperature. The battery modules 11(1) to 11(4) have variation in SOC. The battery module 11(1) has an SOC of 45%, the battery module 11(2) has an SOC of 50%, the battery module 11(3) has an SOC of 55%, and the battery module 11(4) has an SOC of 50%. The first process determines a supplied power supplied to the heating device 11b of one of the battery modules (the battery module 11(3) in the above-described example) that has a higher SOC, among the plurality of battery modules 11(1) to 11(4), so that the supplied power to the heating device 11b of the battery module 11b(3) is higher than the other ones.

In the distribution circuit 11d shown in FIG. 2, the duty ratio of switch 11d1 of the battery module 11(3) is made greater than those of the other battery modules 11(1, 2, 4). As a result, the electric power supplied to the heating device 11b(3) of the battery module 11(3) becomes higher than the electric power supplied to the heating devices 11b(1, 2, 4) of the other battery modules 11(1, 2, 4). This reduces the amount of charge to the battery module 11(3), so that the difference of the amount of charge is kept small from the other battery modules 11(1, 2, 4). For example, the duty ratio of the switch 11*d*1 of the battery module 11(3), which has an SOC of 55%, is set to 30%. The duty ratio of the switch 11*d*1 of the battery modules 11(2, 4), which have an SOC of 50%, is set to 20%. The duty ratio of the switch 11*d*1 of the battery module 11(1), which has an SOC of 45%, is set to 10%.

As a result, in the battery module 11(3), electric power is consumed by the heating device 11*b*(3), and charging to the battery 11*a*(3) is kept low. In contrast, in the battery module 11(1), the heating device 11*b*(1) consumes less electric power, and a larger amount of electric power is used to charge the battery 11*a*(3). This reduces the difference in SOC between the battery module 11(1) and the battery module 11(3) and accordingly reduces variation in SOC among the battery modules 11(1) to 11(4). Then, after the variation in SOC among the battery modules 11(1) to 11(4) has been eliminated, the duty ratios of the respective switches 11*d*1 of the battery modules 11(1) to 11(4) may be made uniform. By supplying electric power to the heating devices 11*b* of the battery modules 11(1) to 11(4), the variation in SOC can be reduced, and also, the battery modules 11(1) to 11(4) can be heated to an appropriate temperature. As a result, electric power can be utilized effectively.

Here, it is assumed that, at a duty ratio of 10%, the temperature of the battery 11*a* rises by 5° C. after 15 minutes. In this case, after 5 minutes, the temperature of the battery module 11(3) reaches 15° C., the temperatures of the battery modules 11(2, 4) reach 10° C., and the temperature of the battery module 11(1) reaches 5° C. Thus, each of the battery modules 11(1) to 11(4) is heated according to the duty ratio of each of the switches 11*d*1, and also, the charging speed is kept low. After 15 minutes, the temperatures of all the battery modules 11(1) to 11(4) reach 5° C. or higher.

As described above, the first process determines a supplied power supplied to the heating device of each of the plurality of battery modules battery modules 11(1) to 11(4) so that when at least one of the plurality of battery modules 11 has a higher SOC than the other battery modules 11, the supplied power to the heating device of the at least one battery module 11 is higher than the other battery modules 11. As a result, in the first process, although the temperatures of the battery modules 11(1) to 11(4) show variations, the variation in SOC among the battery modules 11(1) to 11(4) is reduced. This allows the secondary battery system 10 (battery pack) to fully exhibit its performance more easily because the input/output power is less likely to be restricted due to the variations in SOC.

In addition, there may be cases where the secondary battery system 10 mounted on a vehicle incorporates a cooling device that cools the battery modules 11(1) to 11(4), for example, by means of a device that blows air with an air-cooling fan or that circulates a cooling medium. In the secondary battery system 10 mounted on a vehicle, some locations are cooled faster and other locations are not, so variation may occur in the temperatures of the plurality of battery modules 11(1) to 11(4). On the other hand, in secondary batteries containing a non-aqueous electrolyte solution, as the temperature lowers, the viscosity of the electrolyte solution rises and the internal resistance increases, so the charge-discharge characteristics tend to lower. This means that the battery module 11 tends to have higher battery resistance when the temperature is lower.

In particular, the output power performance is degraded under a very cold temperature environment. For this reason, there may be cases where the secondary battery system 10 of a battery electric vehicle may have a minimum temperature as a temperature suitable for operation. Such a minimum temperature is set in the controller 12 that controls the battery modules 11(1) to 11(4). The minimum temperature is set to be, for example, from −5° C. to +5° C. In order to maintain the driving performance and the charging performance of the vehicle, it is necessary that the battery temperature be maintained to be higher than or equal to such a minimum temperature. Because the secondary battery system 10 mounted on a vehicle is large in size, variations in temperature between the battery cells are likely to occur. However, when the battery temperature is higher than or equal to the minimum temperature, it is possible to maintain the required charge-discharge performance. Conversely, when the temperature is higher, batteries undergo greater self-discharge. This causes the SOC to decrease, causing variations. For this reason, it is usually required that the temperature control within a battery assembly be set within a predetermined range, such as within plus or minus 5° C. at the upper and lower limits. Moreover, when the battery increases its temperature, it may also be a cause of service life deterioration. For this reason, an upper limit of use temperature is set. The upper limit of use temperature may be, for example, set to 65° C.

Second Process

The second process is a process of determining, prior to the first process, a supplied power supplied to the heating device of one of the plurality of battery modules 11(1) to 11(4) that has a temperature lower than a predetermined temperature so that the one battery module reaches the predetermined temperature.

For example, assume that the predetermined temperature for the battery modules 11(1) to 11(4) is 5° C. Also assume that the battery modules 11(1) to 11(4) have variation in temperature; and the battery module 11(1) has a temperature of 5° C., the battery module 11(2) has a temperature of −5° C., the battery module 11(3) has a temperature of 0° C., and the battery module 11(4) has a temperature of 5° C.

In this case, the battery modules 11(2, 3) have a temperature lower than the predetermined temperature (5° C.). The second process determines a supplied power supplied to the heating devices of the battery modules 11(2, 3) so that the battery modules 11(2, 3) having a temperature lower than a minimum temperature reach a predetermined temperature (5° C.). This determining is performed prior to the first process.

When the first process is not considered, for example, the duty ratio of the switches 11*d*1 of the battery modules 11(2, 3) is set to, e.g., 30% while the duty ratio of the switches 11*d*1 of the battery modules 11(1, 4) is set to 10% so that the supplied power is fed to the heating devices 11*b*. The second process may be configured so that the battery modules 11(2, 3) are quickly heated to a temperature higher than the minimum temperature. The duty ratio of the switches 11*d*1 of the battery modules 11(1) to 11(4) may be reviewed every predetermined time. For example, it is possible that temperature information may be acquired from the battery modules 11(1) to 11(4) to determine whether or not the temperature of each of the battery modules is lower than the minimum temperature.

In the second process, the SOCs of the battery modules 11(1) to 11(4) are further taken into consideration, and the first process is applied. Specifically, in the first process, the supplied power supplied to the heating device 11*b* of each of the battery modules 11(1) to 11(4) is determined so that when one of the battery modules 11 has a higher (SOC) or a higher amount of charge than other battery modules 11, the supplied power to the heating device 11*b* of the one battery module 11 is higher than the other battery modules 11.

Figure 4:
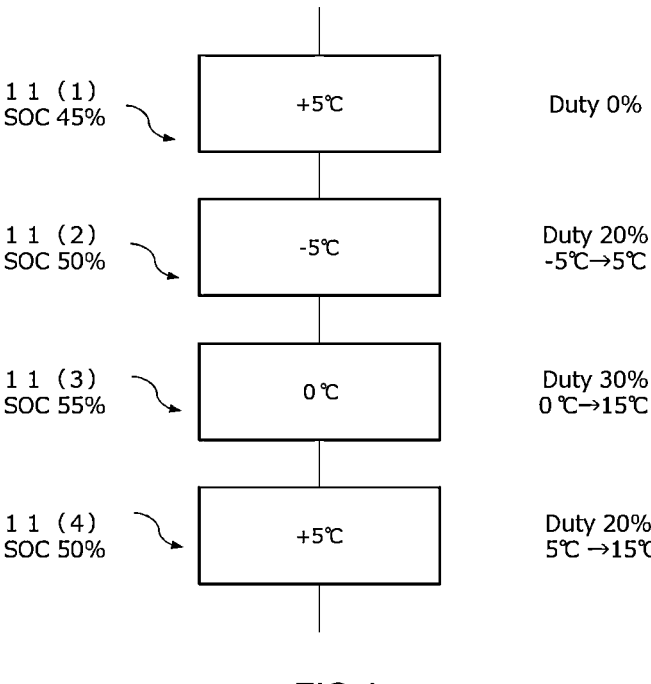
FIG. 4 is a schematic view illustrating an example where a second process is applied prior to the first process.

FIG. 4 is a schematic view illustrating an example where the second process is applied prior to the first process. In the example shown in FIG. 4, the battery module 11(1) has a temperature of 5° C. and an SOC of 45%, the battery module 11(2) has a temperature of –5° C. and an SOC of 50%, the battery module 11(3) has a temperature of 5° C. and an SOC of 55%, and the battery module 11(4) has a temperature of 5° C. and an SOC of 50%. In this case, the second process determines, prior to the first process, a supplied power supplied to the heating devices 11*b*(2), (3) of the battery modules 11(2, 3), among the plurality of battery modules 11(1) to 11(4), that have a temperature lower than a predetermined temperature so that the battery modules 11(2, 3) reach the predetermined temperature.

In this embodiment, the duty ratio for the battery module 11(2), which has an SOC of 50%, is set to 20%, and the duty ratio for the battery module 11(3), which has an SOC of 55%, is set to 30%. In addition, the first process is applied to the battery modules 11(1, 4), which are at the predetermined temperature (5° C.). In this embodiment, the duty ratios of the switches 11*d*1 of the battery modules 11(1, 4) are set to 0% for the battery module 11(1) having an SOC of 45%, and 20% for the battery module 11(4) having an SOC of 50%, respectively. It is assumed that, at a duty ratio of 10%, the temperature of the battery module 11 rises by 5° C. after 15 minutes. After 15 minutes, the temperature of the battery module 11(2) reaches the predetermined temperature, 5° C. The temperature of each of the battery modules 11(3, 4) reaches 15° C.

Thereafter, the first process is executed to control the duty ratio of the switch 11*d*1 of each of the battery modules 11, so that the duty ratio of the batteries having a higher SOC is set higher correspondingly. This reduces the variation in SOC. Then, after the variation in SOC among the battery modules 11(1) to 11(4) has been eliminated, the duty ratios of the respective switches 11*d*1 of the battery modules 11(1) to 11(4) may be made uniform. Thus, the second process determines, prior to the first process, a supplied power supplied to the heating device 11*b* of one of the plurality of battery modules 11(1) to 11(4) that has a temperature lower than a predetermined temperature so that the one of the battery modules 11 reaches the predetermined temperature. Thereafter, the first process is executed to reduce the variation in SOC. Thus, after the battery modules 11(1) to 11(4) have reached a predetermined temperature quickly, the variation in SOC is reduced by the first process.

In this embodiment, the secondary battery system 10 is an on-board system of an electric vehicle (battery EV). The secondary battery system 10 is configured to activate the controller 12 when the electric vehicle is chargeably connected to an external power supply. That is, the controller 12 controls supply of electric power to the heating device 11*b* of each of the battery modules 11 while the secondary battery system 10 mounted on board is being charged, to reduce the variation in SOC. Herein, the phrase "when the electric vehicle is chargeably connected to an external power supply" may mean that the electric vehicle is connected to a charge plug at a charging station or that the electric vehicle is connected to an external power supply with a contactless system.

The secondary battery system 10 may be an on-board system of an electric vehicle and may be controller 12 to activate the controller 12 so that the secondary battery system 10 can perform a predetermined charge and discharge operation according to a scheduled starting time of the electric vehicle. That is, according to the scheduled starting time of the electric vehicle, the controller 12 may control supply of electric power to the heating device 11*b* of each of the battery modules 11 while the secondary battery system 10 mounted on board is being charged, to reduce the variation in SOC. As a result, the SOCs of the battery modules 11 of the secondary battery system 10 are made uniform when starting the vehicle, allowing the secondary battery system 10 to fully exhibit its performance easily.

The secondary battery system 10 may be an on-board system of an electric vehicle and may be configured to supply power from the batteries 11*a* to the heating devices 11*b* based on the temperature, SOC, or amount of charge of each of the plurality of battery modules 11(1) to 11(4). For example, when the vehicle is parked, a battery voltage of the battery 11*a* of the battery module 11 may be applied to the heating device 11*b* according to the first process or the second process. As a result, the temperature of the battery modules 11 is kept higher than or equal to a predetermined temperature, and the variation in SOC among the battery modules 11 is reduced. This allows the secondary battery system 10 to fully exhibit its performance easily.

The secondary battery system 10 may be an on-board system of an electric vehicle, and in the second process, the predetermined temperature may be set to be lower when the electric vehicle is not connected chargeably to an external power supply than when the electric vehicle is connected chargeably to the external power supply. For example, when the vehicle is connected chargeably to an external power supply, the vehicle is supplied with power, so the predetermined temperature may be set to a target temperature such that the vehicle can travel, to control the heating devices 11*b*. On the other hand, when the vehicle is not connected chargeably to an external power supply, the vehicle is not supplied with power, so the predetermined temperature may be set at such a lower temperature that does not cause problems in the travel of the vehicle. This gives priority to keeping a sufficient remaining battery charge level while maintaining the battery temperature of the battery modules 11 to such a temperature that does not cause problems in the travel of the vehicle.

Figure 5:
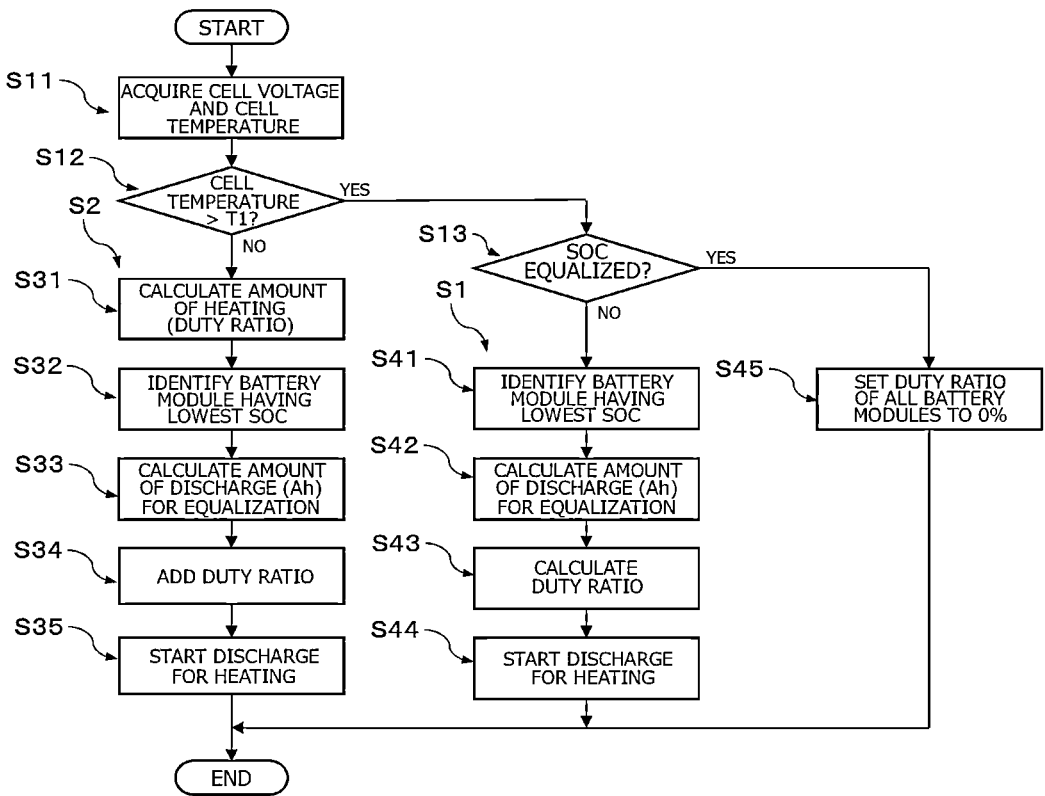
FIG. 5 is a flow-chart illustrating an example of the control flow for the secondary battery system 10 according to the present disclosure.

FIG. 5 is a flow-chart illustrating an example of the control flow for the secondary battery system 10 according to the present disclosure.

As illustrated in FIG. 5, the secondary battery system 10 first acquires the information of cell voltage and cell temperature from the plurality of battery modules 11 contained in the secondary battery system 10 (S11). Next, it is determined whether or not the cell temperatures acquired from the plurality of battery modules 11 are higher than a predetermined temperature T1 (S12).

If the cell temperatures acquired from the plurality of battery modules 11 are not higher than the predetermined temperature (No) in this determination (S12), the above-described second process (S2) is executed.

In the control flow shown in FIG. 5, the following processes S31 to S35 are executed in the second process S2.

S31: Calculate the required amount of heating that is necessary to heat one of the plurality of battery modules 11 that has the lowest temperature to reach the minimum temperature. In the above-described embodiment, it is possible to calculate a duty ratio required for the one of the battery modules 11 having the lowest temperature to reach the minimum temperature in a predetermined time.

S32: Identify one of the plurality of battery modules 11 that has the lowest SOC.

S33: Calculate an amount of discharge (Ah) that is necessary to equalize the SOCs or the amounts of charge between the plurality of battery modules 11.

S34: Add the duty ratio of each of the battery modules 11 calculated according to the amount of discharge calculated in S33 to the duty ratio calculated in S31.

S35: Transmit the duty ratio to the monitor and control circuit 11d2 (see FIG. 2) of each of the battery modules 11 to control the switch 11d1, and start discharge to the heating device 11b.

By the second process (S2), the battery module 11 that has a cell temperature not higher than the predetermined temperature T1 is heated, and also the SOCs of the plurality of battery modules 11 are equalized.

If the cell temperatures acquired from the plurality of battery modules 11 are higher than the predetermined temperature T1 (Yes) in the determination (S12), it is determined whether or not the SOCs of the plurality of battery modules 11 are uniform (S13). If the SOCs of the plurality of battery modules 11 are not uniform (No), the first process (S1) is executed for equalizing the SOCs of the plurality of battery modules 11.

In the control flow shown in FIG. 5, the following processes S41 to S44 are executed in the first process S1.

S41: Identify one of the plurality of battery modules 11 that has the lowest SOC.

S42: Calculate an amount of discharge (Ah) that is necessary to equalize the SOCs or the amounts of charge between the plurality of battery modules 11.

S43: Calculate the duty ratio of each of the battery modules 11 calculated according to the amount of discharge calculated in S42.

S44: Transmit the duty ratio to the monitor and control circuit 11d2 (see FIG. 2) of each of the battery modules 11 to control the switch 11d1, and start discharge to the heating device 11b.

By the first process (S1), the battery is discharged to the heating device 11b of the battery module 11 to heat the battery module 11 and also to equalize the SOCs of the plurality of battery modules 11.

In the control flow shown in FIG. 5, if the SOCs of the plurality of battery modules 11 are uniform (Yes) in the determination (S13), a process of setting the duty ratio of the plurality of battery module 11 to 0% is executed (S45). By this process (S45), the electric current passed to the heating device 11b is stopped, so the discharging for heating is stopped. This serves to maintain the electric power of the battery module 11, all of which is used for charging at the time of charging.

Although the control flow shown in FIG. 5 shows that the SOCs of the plurality of battery modules 11 are equalized, the secondary battery system 10 may be controlled so as to equalize the amounts of charge of the plurality of battery modules 11. For example, in the secondary battery system 10, the SOCs of the battery modules 11 may be equalized in such cases where the SOCs of the battery modules 11 are used to manage the state of charge of the secondary battery system 10 and the upper limit voltage and the lower limit voltage are set. Alternatively, the amounts of charge of the battery modules 11 may be equalized in such cases where the amounts of charge of the battery modules 11 are used to manage the state of charge and the upper limit voltage and the lower limit voltage are set.

FIG. 5 shows an example of the control flow for the secondary battery system 10. Unless specifically stated otherwise, the control flow for the secondary battery system 10 is not limited to the control flow shown in FIG. 5.

The controller 12 disclosed herein is a controller for the secondary battery system 10 including the plurality of battery modules 11. As illustrated in FIG. 1, each of the plurality of battery modules 11 includes a battery 11a, a heating device 11b, a temperature sensor 11c, and a distribution circuit 11d connected in parallel to the battery 11a. The heating device 11b is wired to the distribution circuit 11d so as to be supplied with power through the distribution circuit 11d and is configured so that an amount of heat produced increases according to the supplied power. The controller 12 is configured to execute the first process S1 (see FIG. 5) of determining the supplied power supplied to the heating device 11b of each of the plurality of battery modules 11 so that when at least one of the plurality of battery modules 11 has a higher SOC or a higher amount of charge than other battery modules 11, the supplied power to the heating device 11b of the at least one battery module 11 is higher than the other battery modules 11.

The controller 12 may also be configured to execute the second process S2 (see FIG. 5) of determining, prior to the first process S1, the supplied power supplied to the heating device 11b of at least one of the plurality of battery modules 11 having a temperature lower than a predetermined temperature so that the at least one battery module 11 reaches the predetermined temperature.

The controller 12 disclosed herein may be incorporated, for example, in the secondary battery system 10, as illustrated in FIG. 1.

The control method disclosed herein is a control method for the secondary battery system 10 including the plurality of battery modules 11. As illustrated in FIG. 1, each of the plurality of battery modules 11 includes a battery 11a, a heating device 11b, a temperature sensor 11c, and a distribution circuit 11d connected in parallel to the battery 11a. The heating device 11b is wired to the distribution circuit 11d so as to be supplied with power through the distribution circuit 11d and is configured so that an amount of heat produced increases according to the supplied power. The control method is configured to execute the first process S1 (see FIG. 5) of determining the supplied power supplied to the heating device 11b of each of the plurality of battery modules 11 so that when at least one of the plurality of battery modules 11 has a higher SOC or a higher amount of charge than other battery modules 11, the supplied power to the heating device 11b of the at least one battery module 11 is higher than the other battery modules 11.

The control method may also be configured to execute the second process S2 (see FIG. 5) of determining, prior to the first process S1, the supplied power supplied to the heating device 11b of at least one of the plurality of battery modules 11 having a temperature lower than a predetermined temperature so that the at least one battery module 11 reaches the predetermined temperature. The control method disclosed herein may be used for the on-board secondary battery system 10, for example, as illustrated in FIG. 1.

The program disclosed herein is a program for the controller 12 of the secondary battery system 10 including the plurality of battery modules 11.

As illustrated in FIG. 1, each of the plurality of battery modules 11 includes a battery 11a, a heating device 11b, a temperature sensor 11c, and a distribution circuit 11d connected in parallel to the battery 11a. The heating device 11b is wired to the distribution circuit 11d so as to be supplied with power through the distribution circuit 11d and is configured so that an amount of heat produced increases according to the supplied power. The program is configured to execute the first process S1 (see FIG. 5) of determining the supplied power supplied to the heating device 11b of each of the plurality of battery modules 11 so that when at least one of the plurality of battery modules 11 has a higher SOC or a higher amount of charge than other battery modules 11, the supplied power to the heating device 11b of the at least one battery module 11 is higher than the other battery modules 11.

The program may also be configured to execute the second process S2 (see FIG. 5) of determining, prior to the first process S1, the supplied power supplied to the heating device 11b of at least one of the plurality of battery modules 11 having a temperature lower than a predetermined temperature so that the at least one battery module 11 reaches the predetermined temperature.

Herein, the program may be configured to, when the secondary battery system is an on-board system of an electric vehicle, activate the controller when the electric vehicle is connected chargeably to an external power supply. The program may also be configured to, when the secondary battery system is an on-board system of an electric vehicle, activate the controller according to a scheduled starting time of the electric vehicle. The program may also be configured to, when the secondary battery system is an on-board system of an electric vehicle, supply power from the batteries to the heating devices based on the temperature, SOC, or amount of charge of each of the plurality of battery modules. The program may also be configured to, when the secondary battery system is an on-board system of an electric vehicle, set the predetermined temperature to be lower when the electric vehicle is not connected chargeably to an external power supply than when the electric vehicle is connected chargeably to the external power supply.

The program disclosed herein may be written into the controller of a vehicle so that it can be introduced in the controller of the vehicle, or a BMC. For example, it is also possible that the program may be distributed to the vehicle to update the controller or BMC of the vehicle so that the program is incorporated in the controller of the vehicle to cause the controller or the BMC to function according to the above-described program.

Herein, the program may be stored in, for example, a non-transitory computer readable medium. It is also possible that the program may be supplied to a computer through such a non-transitory computer readable medium. Examples of the non-transitory computer readable medium include magnetic recording media (such as flexible disks, magnetic tapes, and hard disk drives) and CD-ROMs.

Herein, the controller may typically be a computer, which may include a memory storage device (such as memory) and an arithmetic unit (such as a CPU). Various processes of the controller may be implemented as processing modules executed by predetermined programs. Various functions of the controller may be implemented appropriately by cooperative combinations of physical components and control operations based on the results of computation performed according to predetermined programs.

The controller may be such that a plurality of controllers cooperate with each other. For example, when the controller is data-communicably connected to an external computer via, for example, LAN cables, wireless communication lines, or the Internet, the processes of the controller may be performed in cooperation with such an external computer. For example, the information that is to be stored in the controller, or part of the information, may be stored in an external computer. The process to be executed by the controller, or a portion of the process, may be executed by an external computer.

The secondary battery may be an electric power storing element configured to be capable of being charged and discharged. The secondary battery is not limited to any particular type, unless otherwise stated. The secondary battery may be, for example, a secondary battery such as a lithium-ion battery or a nickel-metal hydride battery, or an electricity storage element such as an electric double layer capacitor. The lithium-ion secondary battery is a secondary battery that uses lithium as a charge carrier. The lithium-ion secondary battery may be a lithium-ion secondary battery including a liquid electrolyte or what is called an all-solid-state battery using a solid electrolyte.

Various embodiments of the invention have been described hereinabove according to the present disclosure. Unless specifically stated otherwise, the embodiments described herein do not limit the scope of the present invention. It should be noted that various other modifications and alterations may be possible in the embodiments of the invention disclosed herein. In addition, the features, structures, or steps described herein may be omitted as appropriate, or may be combined in any suitable combinations, unless specifically stated otherwise.

What is claimed is:

1. A secondary battery system, comprising:
a plurality of battery modules connected in series; and
a controller, wherein:
each of the plurality of battery modules includes a plurality of batteries, a heating device, and a distribution circuit connected in parallel to the plurality of batteries;
the heating device is wired to the distribution circuit so as to be supplied with power through the distribution circuit and is configured to increase an amount of heat produced according to a supplied power;
the distribution circuit includes a switch and a monitoring control circuit, the monitoring control circuit is configured to control a predetermined duty ratio per cycle of the switch in response to a command from the controller;
the controller is configured to execute a first process of determining the supplied power supplied to the heating device of each of the plurality of battery modules so that in response to at least one battery module of the plurality of battery modules has a higher state of charge (SOC) or a higher amount of charge than other ones, the supplied power to the heating device of the at least one battery module is higher than the other ones; and
the controller is configured to execute the first process to control the predetermined duty ratio per cycle of the switch to distribute current between a current for charging the at least one battery module including the distribution circuit among the plurality of battery modules and a current flowing to the heating device of the at least one battery module including the distribution circuit to heat the at least one battery module.

2. The secondary battery system according to claim 1, wherein:
each of the plurality of battery modules includes a temperature sensor; and
the controller is configured to execute a second process of determining, prior to the first process, the supplied power supplied to the heating device of at least one of the plurality of battery modules having a temperature lower than a predetermined temperature so that the at least one battery module reaches the predetermined temperature.

3. The secondary battery system according to claim 1, being an on-board system of an electric vehicle and being configured to activate the controller in response to the electric vehicle being connected chargeably to an external power supply.

4. The secondary battery system according to claim 1, being an on-board system of an electric vehicle and being configured to activate the controller so as to perform a predetermined charge and discharge operation according to a scheduled starting time of the electric vehicle.

5. The secondary battery system according to claim 1, being an on-board system of an electric vehicle and being configured to supply power from the plurality of batteries to the heating devices based on a temperature, SOC, or amount of charge of each of the plurality of battery modules.

6. The secondary battery system according to claim 2, being an on-board system of an electric vehicle, and wherein the predetermined temperature is set to be lower when the electric vehicle is not connected chargeably to an external power supply than when the electric vehicle is connected chargeably to the external power supply.

7. A controller for a secondary battery system including a plurality of battery modules, the controller comprising:

each of the plurality of battery modules including a plurality of batteries, a heating device, a temperature sensor, and a distribution circuit connected in parallel to the plurality of batteries, wherein the heating device is wired to the distribution circuit to be supplied with power through the distribution circuit and is configured to increase an amount of heat produced according to a supplied power; and the distribution circuit includes a switch and a monitoring control circuit, the monitoring control circuit is configured to control a predetermined duty ratio per cycle of the switch in response to a command from the controller, and the controller being configured to execute a first process of determining the supplied power supplied to the heating device of each of the plurality of battery modules so that in response to at least one battery module of the plurality of battery modules has a higher state of charge (SOC) or a higher amount of charge than other ones, the supplied power to the heating device of the at least one battery module is higher than the other ones, wherein the controller is configured to execute the first process to control the predetermined duty ratio per cycle of the switch to distribute current between a current for charging the at least one battery module including the distribution circuit among the plurality of battery modules and a current flowing to the heating device of the at least one battery module including the distribution circuit to heat the at least one battery module.

8. The controller according to claim 7, being configured to execute a second process of determining, prior to the first process, the supplied power supplied to the heating device of at least one of the plurality of battery modules having a temperature lower than a predetermined temperature so that the at least one battery module reaches the predetermined temperature.

9. The controller according to claim 7, wherein the secondary battery system is an on-board system of an electric vehicle, and the secondary battery system is configured to activate the controller in response to the electric vehicle being connected chargeably to an external power supply.

10. The controller according to claim 7, wherein the secondary battery system is an on-board system of an electric vehicle, the secondary battery system is configured to activate the controller so as to perform a predetermined charge and discharge operation according to a scheduled starting time of the electric vehicle.

11. The controller according to claim 7, wherein the secondary battery system is an on-board system of an electric vehicle, and the secondary battery system is configured to supply power from the plurality of batteries to the heating devices based on a temperature, SOC, or amount of charge of each of the plurality of battery modules.

12. The controller according to claim 8, wherein the secondary battery system is an on-board system of an electric vehicle, and the predetermined temperature is set to be lower when the electric vehicle is not connected chargeably to an external power supply than when the electric vehicle is connected chargeably to the external power supply.

13. A control method for a secondary battery system including a plurality of battery modules, each of the plurality of battery modules including a plurality of batteries, a heating device, a temperature sensor, and a distribution circuit connected in parallel to the plurality of batteries, wherein the heating device is wired to the distribution circuit so as to be supplied with power through the distribution circuit and is configured to increase an amount of heat produced according to a supplied power, and the distribution circuit includes a switch and a monitoring control circuit, the monitoring control circuit controlling a predetermined duty ratio per cycle of the switch in response to a command, and the method comprising a first process of determining the supplied power supplied to the heating device of each of the plurality of battery modules so that in response to at least one battery module of the plurality of battery modules has a higher state of charge (SOC) or a higher amount of charge than other ones, the supplied power to the heating device of the at least one battery module is higher than the other ones, wherein the first process is executed to control the predetermined duty ratio per cycle of the switch to distribute current between a current for charging the at least one battery module including the distribution circuit among the plurality of battery modules and a current flowing to the heating device of the at least one battery module including the distribution circuit to heat the at least one battery module.

14. The control method according to claim 13, further comprising determining, prior to the first process, the supplied power supplied to the heating device of at least one of the plurality of battery modules having a temperature lower than a predetermined temperature so that the at least one battery module reaches the predetermined temperature.

15. The control method according to claim 13, wherein the secondary battery system is an on-board system of an electric vehicle, and the secondary battery system is configured to activate a controller executing the control method in response to the electric vehicle being connected chargeably to an external power supply.

16. The control method according to claim 13, wherein the secondary battery system is an on-board system of an electric vehicle, the secondary battery system is configured to activate a controller executing the control method so as to perform a predetermined charge and discharge operation according to a scheduled starting time of the electric vehicle.

17. The control method according to claim 13, wherein the secondary battery system is an on-board system of an electric vehicle, and the secondary battery system is configured to supply power from the plurality of batteries to the heating devices based on a temperature, SOC, or amount of charge of each of the plurality of battery modules.

18. The control method according to claim 14, wherein the secondary battery system is an on-board system of an electric vehicle, and the predetermined temperature is set to be lower when the electric vehicle is not connected chargeably to an external power supply than when the electric vehicle is connected chargeably to the external power supply.

19. A non-transitory computer readable medium storing a program for a controller for a secondary battery system including a plurality of battery modules, each of the plurality of battery modules including a plurality of batteries, a heating device, a temperature sensor, and a distribution circuit connected in parallel to the plurality of batteries, wherein the distribution circuit includes a switch and a monitoring control circuit, the heating device being wired to the distribution circuit so as to be supplied with power through the distribution circuit and being configured so that an amount of heat produced increases according to a supplied power, the program causing the controller to execute a first process of determining the supplied power supplied to the heating device of each of the plurality of battery modules so that in response to at least one battery module of the plurality of battery modules has a higher state of charge (SOC) or a higher amount of charge than other ones, the supplied power to the heating device of the at least one battery module is higher than the other ones, the program causing the monitoring control circuit to control a predetermined duty ratio per cycle of the switch in response to a command from the controller, and the program causing the controller to execute the first process to control the predetermined duty ratio per cycle of the switch to distribute current between a current for charging the at least one battery module including the distribution circuit among the plurality of battery modules and a current flowing to the heating device of the at least one battery module including the distribution circuit to heat the at least one battery module.

20. The non-transitory computer readable medium according to claim 19, wherein the program causes the controller to execute a second process of determining, prior to the first process, the supplied power supplied to the heating device of at least one of the plurality of battery modules having a temperature lower than a predetermined temperature so that the at least one battery module reaches the predetermined temperature.

\* \* \* \* \*